United States Patent
Marron (10) Patent No.: US 7,130,059 B2
(45) Date of Patent: Oct. 31, 2006

(54) COMMON-PATH FREQUENCY-SCANNING INTERFEROMETER

(75) Inventor: Joseph C. Marron, Ann Arbor, MI (US)

(73) Assignee: Light Gage, Inc, Bloomfield, NY (US)

( * ) Notice: Subject to any disclaimer, the term of this patent is extended or adjusted under 35 U.S.C. 154(b) by 441 days.

(21) Appl. No.: 10/465,181

(22) Filed: Jun. 19, 2003

(65) Prior Publication Data
US 2003/0234936 A1 Dec. 25, 2003

Related U.S. Application Data

(60) Provisional application No. 60/309,970, filed on Jun. 24, 2002.

(51) Int. Cl.
*G01B 11/02* (2006.01)

(52) U.S. Cl. .................................... 356/512

(58) Field of Classification Search ........ 356/512–515, 356/489, 495
See application file for complete search history.

(56) References Cited

U.S. PATENT DOCUMENTS

| | | | |
|---|---|---|---|
| 4,594,003 A | 6/1986 | Sommargren | |
| 4,832,489 A | 5/1989 | Wyant et al. | 356/359 |
| 5,319,668 A | 6/1994 | Luecke | 372/107 |
| 5,473,434 A | 12/1995 | de Groot | 356/359 |
| 5,502,566 A | 3/1996 | Ai et al. | 356/359 |
| 5,627,363 A | 5/1997 | Paxman et al. | 350/208.1 |
| 5,689,337 A * | 11/1997 | Lamb et al. | 356/514 |
| 5,777,742 A | 7/1998 | Marron | 356/359 |
| 5,802,085 A | 9/1998 | Lefevre et al. | 372/20 |
| 5,867,512 A | 2/1999 | Sacher | 372/20 |
| 5,880,841 A | 3/1999 | Marron et al. | 356/360 |
| 5,907,404 A | 5/1999 | Marron et al. | 356/360 |
| 5,909,282 A | 6/1999 | Kulawiec | 356/355 |
| 5,926,277 A | 7/1999 | Marron et al. | 356/360 |
| 6,006,128 A | 12/1999 | Izatt et al. | 600/476 |
| 6,018,535 A | 1/2000 | Maeda | 372/20 |

(Continued)

OTHER PUBLICATIONS

"Multiple-wavelength Interferometry With Tunable Source", R.G. Pilston and G.N. Steinberg, Applied Optics, vol. 8, No. 3, Mar. 1969, pp. 552-556.

(Continued)

*Primary Examiner*—Gregory J. Toatley, Jr.
*Assistant Examiner*—Patrick J. Connolly
(74) *Attorney, Agent, or Firm*—Brian B. Shaw, Esq.; Thomas B. Ryan; Harter Secrest, LLP (57) ABSTRACT

Frequency-scanning interferometry is applied to common-path interferometers for measuring topographical features of test objects. A reference element located adjacent to a test object functions as both a beamsplitter and a reference surface. A first portion of a measuring beam reflects from the reference surface of the reference element as a reference beam, and a second portion of the measuring beam transmits through the reference element to and from a surface of the test object as an object beam. Both beams are conveyed along a common path to a detector that records a plurality of intensity variations produced by constructive and destructive interference between localized portions of the object and reference beams associated with different transverse coordinates on the test object surface. An illumination frequency of the measuring beam is incrementally modified through a range of different frequencies sufficient to alternate the intensity variations between conditions of constructive and destructive interference, which occur at modulation frequencies sensitive to path length differences between corresponding points on the surfaces of the test object and reference element.

32 Claims, 5 Drawing Sheets

U.S. PATENT DOCUMENTS

| 6,026,100 | A | 2/2000 | Maeda | 372/20 |
|---|---|---|---|---|
| 6,028,670 | A | 2/2000 | Deck | 356/359 |
| 6,359,692 | B1 | 3/2002 | Groot | 356/512 |
| 6,882,432 | B1 | 4/2005 | Deck | 356/512 |
| 6,924,898 | B1 | 8/2005 | Deck | |
| 2002/0109851 | A1 | 8/2002 | Deck | 356/512 |
| 2002/0176091 | A1* | 11/2002 | Deck | 356/512 |
| 2003/0160968 | A1 | 8/2003 | Deck | 356/515 |
| 2003/0164951 | A1 | 9/2003 | Deck | 356/519 |

OTHER PUBLICATIONS

"Two-wavelength Interferometry", D. Malarcara, editor, *Optical Shop Testing*, New York, Wiley, 1978, pp. 397-402.

"Multiple-wavelength Phase-shifting Interferometry", Y. Cheng and J.C. Wyant, Applied Optics, vol. 24, No. 6, Mar. 15, 1985, pp. 804-806.

"Distance measurement by the wavelength shift of laser diode light", H. Kikuta, K. Iwata, and R. Nagata, Applied Optics, vol. 25, No. 17, Sep. 1, 1986, pp. 2976-2980.

"Interferometer for measuring displacement and distance", T. Kubota, M. Nara, and T. Yoshino, Optics Letters, vol. 12, No. 5, May 1987, pp. 310-312.

"Three-color laser-diode interferometer", P. de Groot, Applied Optics, vol. 30, No. 25, Sep. 1, 1991, pp. 3612-3616.

"Wavelength-shift interferometry for distance measurements using the Fourier transform technique for fringe analysis", M. Suematsu and M. Takeda, Applied Optics, vol. 30, No. 28, Oct. 1, 1991, pp. 4046-4055.

"Three-dimensional lensless imaging using laser frequency diversity", J.C. Marron and K.S. Schroeder, Applied Optics, vol. 31, No. 2, Jan. 10, 1992, pp. 255-262.

"Holographic laser radar", J.C. Marron and K.S. Schroeder, Optics Letters, vol. 18, No. 5, Mar. 1, 1993, pp. 385-387.

"Use of a opacity constraint in three-dimensional imaging", R.G. Paxman, J.H. Seldin, J.R. Fienup, and J.C, Marron, in proceedings of the SPIE Conference on Inverse Optics III, Orlando, Florida, Apr. 1994.

"Applications of Tunable Lasers to Laser Radar and 3D Imaging", L.G. Shirley and G.R. Hallerman, Technical Report 1025, Lincoln Laboratory, MIT, Lexington, Massachusets, Feb. 26, 1996.

"Wavelength scanning profilometry for real-time surface shape measurement", S. Kuwamura and I. Yamaguchi, Applied Optics. vol. 36, No. 19, Jul. 1, 1997, pp. 4473-4482.

"Three-dimensional imaging using a tunable laser source", J.C. Marron and K.W. Gleichman, Optical Engineering 39(1) 47-51, Jan. 2000, pp. 47-51.

"Spectrally narrow pulsed dye laser without beam expander", M.G. Littman and H.J. Metcalf, Applied Optics. vol. 17, No. 14, Jul. 15, 1978, pp. 2224-2227.

"A simple extended-cavity diode laser", A.S. Arnold, J.S. Wilson, and M.G. Boshier, Review of Scientific Instruments, vol. 69, No. 3, Mar. 1998, pp. 1236-1239.

"External-cavity diode laser using a grazing-incidence diffraction grating", K.C. Harvey and C.J. Myatt, Optics Letters, vol. 16, No. 12, Jun. 15, 1991, pp. 910-912.

"Novel geometry for single-mode scanning of tunable lasers", K Liu and M.G. Littman, Optics Letters, vol. 6, No. 3, Mar. 1981, pp. 117-118.

"External-cavity frequency-stabilization of visible and infrared semiconductor lasers for high resolution spectroscopy", M.G. Boshier, D. Berkeland, E.A. Hinds, and V. Sandoghar, Optics Communications 85, Sep. 15, 1991, pp. 355-359.

"Widely Tunable External Cavity Diode Lasers", T. Day, M. Brownell, and I-Fan Wu, New Focus, Inc., 1275 Reamwood Avenue, Sunnydale, California.

"Littrow configuration tunable external cavity diode laser with fixed direction output beam", C.J. Hawthorn, K.P. Weber and R.E. Scholten, Review of Scientific Instruments, vol. 72, No. 12, Dec. 2001, pp. 4477-4479.

"Fizeau Interferometer", D. Malarcara, editor, *Optical Shop Testing*, New York, Wiley, 1978, pp. 19-24.

"Burch's Interferometer Employing Two Matched Scatter Plates", D. Malarcara, editor, *Optical Shop Testing*, New York, Wiley, 1978, pp. 82-84.

"Holographic contouring by using tunable lasers", N. George and W. Li, Optics Letters, vol. 19, No. 22, Nov. 15, 1994, pp. 1879-1881.

"Use of a multimode short-external-cavity laser diode for absolute-distance intererometry", P. de Groot, Applied Optics, vol. 32, No. 22, Aug. 1, 1993, pp. 4193-4198.

"Three-dimensional sensing of rough surfaces by coherence radar", T. Dresel, G. Hausler, and H. Venzke, Applied Optics, vol. 31, No. 7, Mar. 1, 1992, pp. 919-925.

Littrow-Laser web site sacher.de/littrow.htm, Apr. 7, 2002.

"Tunable Diode Lasers—Stand up to Research and Commercial Applications", B. Shine, Laser Product Line Manager, New Focus, Inc., originally published in Photonics Spectra, Jan. 1992, pp. 102.

"Scatter Fringes of Equal Thickness", J.M. Burch, Nature, vol. 17, May 16, 1953, pp. 889-890.

"Scatter-Fringe Interferometry", J.M. Burch, J. Opt. Soc. Am. 52, 1962, pp. 600.

"Some Further Aspects of Scatter-Fringe Interferometry", A.H. Shoemaker and M.V.R.K. Murty, Applied Optics, vol. 5, No. 4, Apr. 1966, pp. 603-607.

"Laser Speckle and Related Phenomena", J.C. Dainty, editor, Springer-Verlag, Berlin, 1984.

"Digital Picture Processing", A. Rosenfeld, and A.C. Kak, vol. 1,. Academic Press. New York. 1982.

* cited by examiner

COMMON-PATH FREQUENCY-SCANNING INTERFEROMETER

RELATED APPLICATIONS

This application claims the benefit of prior filed U.S. Provisional Application No. 60/390,970, filed 24 Jun. 2002, which is hereby incorporated by reference.

TECHNICAL FIELD

Frequency-scanning interferometry, also referred to as wavelength-scanning interferometry or multi-wavelength interferometry, generates a succession of interference patterns at different frequencies of illumination and evaluates the patterns to provide profile measurements of test objects.

BACKGROUND

The development of frequency-scanning interferometers that use multiple laser frequencies, or wavelengths, to perform measurements has been underway for several years. The interferometers are especially useful for measuring surface profiles of test objects as measures of surface variations taken normal to a reference plane or surface. References exemplifying this development include:

R. G. Pilston and G. N. Steinberg, "Multiple-Wavelength Interferometry with Tunable Source," Applied Optics 8 (1969) 553–556.

D. Malacara, editor, "Optical Shop Testing", New York, Wiley (1978) 397–402.

Y. Cheng and J. C. Wyant, "Multiple-Wavelength Phase-Shifting Interferometry," Applied Optics 24 (1985) 804.

More recent developments of frequency-scanning interferometry include the use of components such as tunable diode lasers and CCD detector arrays. As a result, compact, accurate, and fast systems have been developed, which have the capability of performing quality control measurements on many varieties of commercial precision parts. Examples of these more recent developments include:

H. Kikuta, K. Iwata, and R. Nagata, "Distance Measurement by Wavelength Shift of Laser Diode Light," Applied Optics 25 (1986) 2976–2980.

T. Kubota, M. Nara, and T. Yoshino, "Interferometer for Measuring Displacement and Distance," Optics Letters 12 (1987) 310–312.

P. de Groot, "Three-Color Laser-Diode Interferometer," Applied Optics 30 (1991) 3612–3616.

M. Suematsu and M. Takeda, "Wavelength-Shift Interferometry for Distance Measurement using a Fourier Transform Technique for Fringe Analysis," Applied Optics 30 (1991) 4046–4055.

J. C. Marron and K. S. Schroeder, "Three-Dimensional Lensless Imaging Using Laser Frequency Diversity," Applied Optics 31 (1992) 255–262.

J. C. Marron and K. S. Schroeder, "Holographic Laser Radar," Optics Letters 18 (1993) 385–387.

R. G. Paxman, J. H. Seldin, J. R. Fienup, and J. C. Marron, "Use of an Opacity Constraint in Three-Dimensional Imaging," In Proceedings of the SPIE Conference on Inverse Optics III, 2241, Orlando, Fla., April 1994.

L. G. Shirley and G. R. Hallerman, "Applications of Tunable Lasers to Laser Radar and 3D Imaging," Technical Report 1025, Lincoln Laboratory, MIT, Lexington, Mass., 1996.

S. Kuwamura and I. Yamaguchi, "Wavelength Scanning Profilometry for Real-Time Surface Shape Measurement," Applied Optics 36 (1997) 4473–4482.

J. C. Marron and Kurt W. Gleichman, "Three-Dimensional Imaging Using a Tunable Laser Source," Optical Engineering 39 (2000) 47–51.

All of these references from both lists are hereby incorporated by reference for purposes including identifying conventional apparatus and processing algorithms used in the practice of frequency-scanning interferometry.

Figure 1:
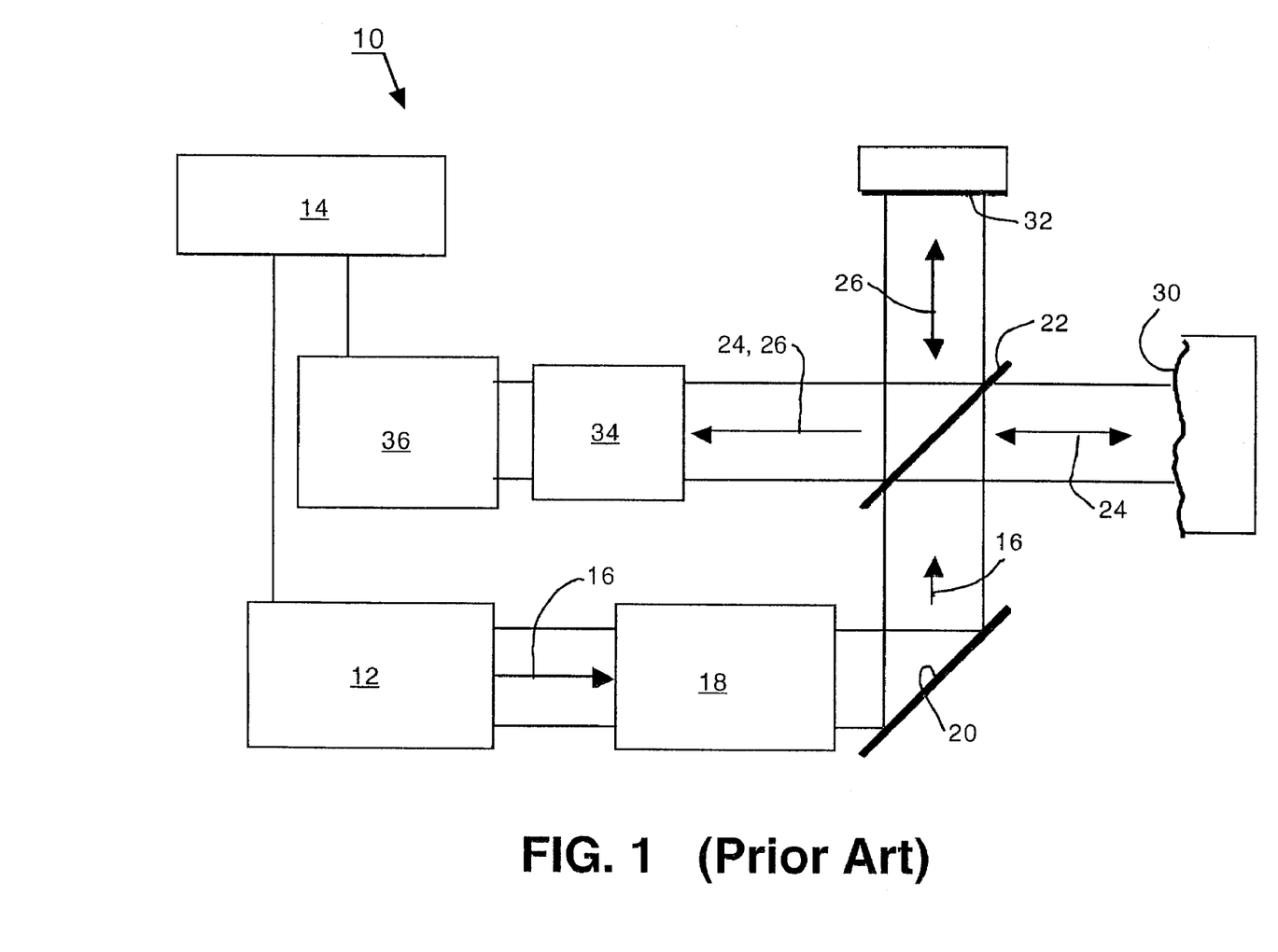
FIG. 1 is a block diagram of a frequency-scanning interferometer in accordance with the prior art, which interferometer is described above.

A known type of frequency-scanning interferometer system 10 is depicted in prior art FIG. 1. While in the overall form of a Twyman-Green interferometer, a tunable laser 12 under the control of a computer 14 produces a measuring beam 16 that can be tuned through a range of different frequencies. Beam-conditioning optics 18 expand and collimate the measuring beam 16. A folding mirror 20 directs the measuring beam 16 to a beamsplitter 22 that divides the measuring beam 16 into an object beam 24 and a reference beam 26. The object beam 24 retroreflects from a test object 30, and the reference beam 26 retroreflects from a reference mirror 32. The beamsplitter 22 recombines the object beam 24 and the reference beam 26, and imaging optics 34 (such as a lens or group of lenses) focus overlapping images of the test object 30 and the reference mirror 32 onto a detector array 36 (such as a CCD array of elements). The detector array 36 records the intensity of an interference pattern produced by path length variations between the object and reference beams 24 and 26. Outputs from the detector array 36 are stored and processed in the computer 14.

The elements of the detector array 36 record local intensity values subject to the interference between the object and reference beams 24 and 26. Each of the intensity values is traceable to a spot on the test object 30. However, instead of evaluating intensity values to determine phase differences between the object and reference beams 24 and 26 as a primary measure of surface variation, a set of additional interference patterns is recorded for a series of different illumination frequencies (or wavelengths) of the measuring beam 16. The tunable laser 12 is stepped through a succession of incrementally varying illumination frequencies, and the detector array 36 records the corresponding interference patterns. Data frames recording individual interference patterns numbering 16 or 32 frames are typical.

The local intensity values vary sinusoidally with changes in illumination frequency between conditions of constructive and destructive interference. The rate of intensity variation, i.e., the frequency of intensity variation, is a function of the path length difference between the local portions of the object and reference beams 24 and 26. Gradual changes in intensity (lower interference frequency variation) occur at small path length differences, and more rapid changes in intensity (higher interference frequency variation) occur at large path length differences.

Discrete Fourier transforms can be used within the computer 14 to identify the interference frequencies of intensity variation accompanying the incremental changes in the illumination frequency of the measuring beam 16. The computer 14 also converts the interference frequencies of intensity variation into measures of local path length differences between the object and reference beams 24 and 26, which can be used to construct a three-dimensional image of the test object 30 as measures of profile variations from a surface of the reference mirror 32. Since the reference mirror 32 is planar, the determined optical path differences are equivalent to deviations of the object 30 from a plane. The resulting three-dimensional topographical information can be further processed to measure important characteristics of the object 30 (e.g. flatness or parallelism), which are useful for quality control of precision-manufactured parts.

The intensity values "I" recorded by elements of the detector array 36 can be written as the sum of two coherent components; one from the object beam 24 "$U_{obj}$" and one from the reference beam 26 "$U_{ref}$" as follows:

$$I=|(U_{obj}+U_{ref})|^2. \tag{1}$$

The recorded intensity corresponds, for example, to the intensity measured by a pixel within the image produced by the object and reference beams 24 and 26. The object beam 24 "$U_{obj}$" can be written as:

$$U_{obj} = A_1 e^{i\left(\frac{2\pi}{\lambda}R_1\right)}, \tag{2}$$

and the reference beam 26 "$U_{ref}$" as:

$$U_{ref} = A_2 e^{i\left(\frac{2\pi}{\lambda}R_2\right)}, \tag{3}$$

where "$A_1$" and "$A_2$" are the amplitudes, "$\lambda$" is the wavelength, and "$R_1$" and "$R_2$" are the optical paths for the two beams 24 and 26. Considering the path difference as $R=R_1-R_2$, intensity "I" can be written as:

$$I = |A_1|^2 + |A_2|^2 + 2A_1 A_2 \cos\left(\frac{2\pi}{\lambda}R\right), \tag{4}$$

or, using frequency notation:

$$I = |A_1|^2 + |A_2|^2 + 2A_1 A_2 \cos\left(\frac{2\pi}{\lambda}RV\right), \tag{5}$$

where "c" is the speed of light and "v" is the illumination frequency.

Equation (5) shows that the intensity has two basic terms: a bias term equal to "$|A_1|^2+|A_2|^2$" and a cosine term. The sinusoidal intensity variation of interest arises from the cosine term. The bias term is an offset that can be easily removed by computing the mean of the intensity data and subtracting this mean from Equation (5).

As is also apparent from equation (5), the frequency of the cosine term depends upon the frequency (or wavelength) of the measuring beam 16 and "R"—the optical path difference (OPD). Based on the incremental changes in illumination frequency provided by the tunable laser 12, a value of "R" can be fit to the function using Fourier transform methods. The procedure involves recording the interference patterns for a series of "N" illumination frequencies. The data from each detector element is then Fourier transformed using known (or estimated) illumination frequencies, and the locations of the peak interference frequencies of variation reveal the values of "R" for each detector element.

Figure 2:
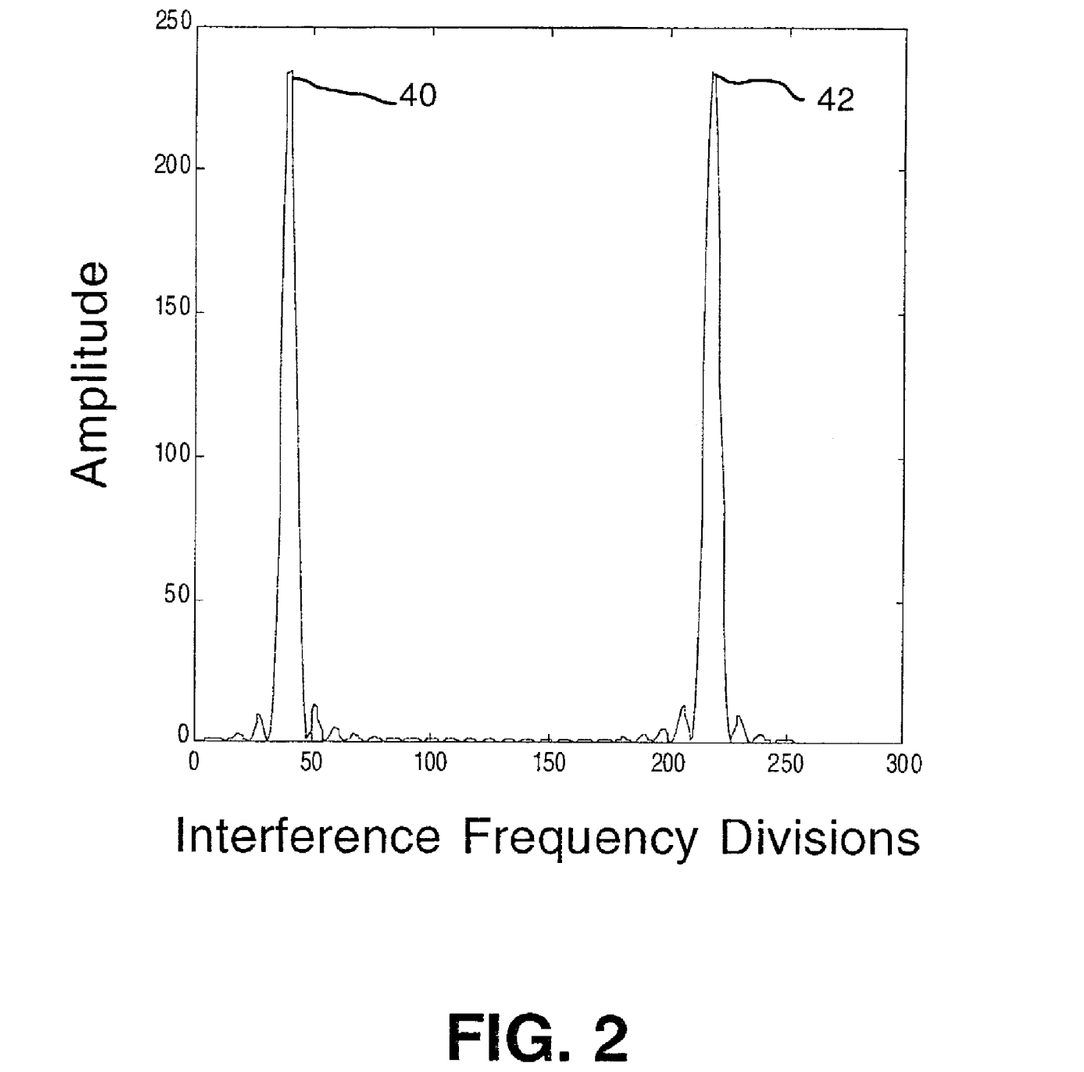
FIG. 2 is a plot of sampled Fourier intensity data showing amplitudes "$|K'|^2$" of the interference frequency divisions sampled, where peak location is a measure of path length difference "R".

FIG. 2 shows a typical result of the discrete Fourier transformation of intensity data corresponding to a typical data set of 32 (N) illumination frequencies recorded by a single detector element and fitted to Equation (5) with the mean value of the illumination intensity subtracted. Plotted are the relative amplitudes $|K'|^2$ of the interference frequency divisions sampled within a bandwidth subdivided into 256 (M) equal subdivisions as follows:

$$|K'|^2=|FFT(I-\bar{I})|^2, \tag{6}$$

where $I=10 + \cos(3\pi n/10)$.

Two interference frequency peaks 40 and 42 result from the cosine function, corresponding to opposite signs of path length difference between the object and reference beams 24 and 26. As path length differences "R" increase, one of the peaks 40 or 42 devolves into the other 42 or 40; the exchange determining the range at which the data can be unambiguously converted into profile variations. The determination of which of the peaks 40 or 42 corresponds to the actual path length difference between the object and reference beams 24 and 26 can be made by phase shifting in which the optical path length difference between the object and reference beams 24 and 26 is deliberately altered in a systematic manner. Examples of phase-shifting methods to resolve the "two-peak" ambiguity and extend the measurement interval are disclosed in the previously referenced paper to J. C. Marron and Kurt W. Gleichman, as well as in U.S. Pat. Nos. 4,832,489; 5,777,742; 5,880,841; 5,907,404; and 5,926,277, which are also hereby incorporated herein.

Although phase shifting is routinely used for resolving interference ambiguities, the practice requires additional measurements, complicates measuring apparatus, and consumes processing time. Common-path interferometric systems, such as Fizeau interferometers, are not easily adaptable to phase shifting. Within common-path interferometric systems, the test object can be mounted together with the reference element within a cavity or the test optic can be mounted on the reference element. Additional requirements for systematically changing to the spacing between the test object and the reference element as required for phase shifting add considerable mechanical complexity and weaken the connection between the test object and reference element exploited by common-path interferometry.

SUMMARY OF INVENTION

The invention extends frequency-scanning interferometry to common-path interferometric systems. The advantages of common-path interferometric systems for reducing sensitivity to environmental effects, such as vibrations and air turbulence, and for reducing dispersion caused by separate optical components along different object and reference beam paths are preserved while a measurement range (i.e., an unambiguous measuring interval) can be expanded.

In accordance with the invention, phase-shifting actuators and techniques are unnecessary to resolve measuring ambiguities. A reference element unencumbered by phase-shifting requirements can be arranged to incorporate the functions of both a reference surface and a beamsplitter. In addition, the reference element can be arranged to support the test object under examination. Locating a reference element functioning also as a beamsplitter adjacent to a test object enables the invention to exploit the benefits of common-path interferometric systems in which a reference beam associated with the reference surface travels along a common path throughout its length with an object beam associated with a surface of the test object. In addition, mounting the test object in a fixed position with respect to the reference element minimizes the influence of disturbances beyond the common path shared by the object and reference beams.

A frequency-scanning interferometric measuring system can be arranged in accordance with the invention to measure topographical features of a test object. A directional system routes a measuring beam along a measurement path toward the test object. A reference element located in a fixed position along the measurement path adjacent to the test object distinguishes a reference beam portion of the measuring beam from an object beam portion of the measuring beam. The reference beam portion acquires information concerning a surface of the reference element, and the object beam portion acquires information concerning a surface of the test object. The directional system also routes the information-laden object and reference beams along a common path toward a detector. The detector provides for detecting combined intensity variations of the information-laden object and reference beams as a comparison between the surfaces of the test object and the reference element.

A frequency modifier varies an effective frequency content of the object and reference beams detected by the detector. A processor converts detected intensity variations induced by variations in the effective frequency content of the information-laden object and reference beams into measures of path length differences between the object and reference beams for measuring topographical features of the test object surface with respect to the reference element surface.

Preferably, the frequency modifier includes a tunable laser source for varying the frequency content of the measuring beam. Both the measurement path toward the test object and the common path toward the detector preferably overlap in opposite directions between the detector and the reference element surface to provide a compact design. Although mounted just beyond the common path of the object and reference beams, the test object is preferably mounted in a fixed relation to the reference element to minimize differential environmental influences between the test object and the reference element. In fact, the reference element is preferably used to mount the test object to strengthen their physical union.

The detector preferably includes a detector array of individual detectors for separately measuring intensity variations associated with different locations of the test object surface. The intensity variations of the individual detectors provide measures of surface profile features at the different locations independently of the intensity variations of adjacent individual detectors. An imaging system images both the test object surface and the reference element surface onto the detector array using the information-laden object and reference beams.

The invention can be specifically configured as a modified Fizeau interferometer for measuring profile variations of a test object using frequency scanning. A radiation source produces a measuring beam. A reference element having a reference surface reflects a first portion of the measuring beam as a reference beam and transmits a second portion of the measuring beam as an object beam to and from a surface of the test object. A detection system detects a plurality of intensity variations produced by constructive and destructive interference between localized portions of the object and reference beams traceable to different transverse coordinates on the test object surface. A pathway conveys the measuring beam to the reference element surface and includes a common pathway that conveys both the object beam as returned from the test object surface and the reference beam as returned from the reference element surface to the detection system.

A frequency modifier modifies an effective frequency of the measuring beam producing an alternation of the intensity variations between conditions of constructive and destructive interference at modulation frequencies corresponding to path length variations between the test object surface and the reference element surface at the different transverse coordinates of the test object surface. A processor identifies the modulation frequencies from the alternating intensity variations for referencing the path length variations between the test object surface and the reference element surface as relative measures of profile variations of the test object surface at the different transverse coordinates of the test object surface.

The frequency modifier preferably includes a frequency tuner for the radiation source for varying a frequency of the measuring beam. The frequency modifier can be arranged to modify the effective frequency of the measuring beam by increments that are fine enough to unambiguously distinguish profile variations between the different transverse coordinates of the test object surface having a range of magnitudes of at least ten times a nominal wavelength of the measuring beam. Measuring ranges of 100 times, 1000 times, or even more times the nominal wavelength are possible by using finer frequency increments of the measuring beam.

The frequency modifier can also be arranged to modify the frequency of the measuring beam throughout a range or band of frequencies sufficient in breadth to distinguish profile variations between the different transverse coordinates of the test object surface having magnitudes that differ by less than ten times the nominal wavelength of the measuring beam. The resolution of path length differences between the object and reference beams is more a function of the frequency range of the measuring beam rather than the nominal frequency of the range. Accordingly, profile variations that differ by less than the nominal wavelength of the measuring beam can be distinguished without phase shifting by expanding the frequency range of the measuring beam.

The reference element preferably takes the form of a window of the interferometer that transmits light (i.e., radiation) to the test object surface and that admits light (i.e., radiation) reflected from the test object surface. The reference element also preferably participates in mounting the test object at a fixed spacing between the test object surface and the reference element surface.

The detection system preferably includes a detector array of individual detectors for separately measuring intensity variations associated with the different transverse coordinates of the test object surface. The intensity variations of the individual detectors provide measures of surface profile features at the different transverse coordinates independently of the intensity variations of adjacent individual detectors. An imaging system images both the test object surface and the reference element surface onto the detector array using the object and reference beams.

Although the detector array records an interference pattern at each of the incrementally varying frequencies of the measuring beam, the interference patterns themselves are not required to be individually interpreted. In fact, roughness of the test object surface can exceed the fringe spacing so that no interference fringes are apparent in the interference patterns. This allows for the measurement of diffuse surfaces, whose interference patterns are apparent as speckle.

The invention does not require a comparison of constructive and destructive interference effects within the individual interference patterns. Each point in the pattern is separately evaluated for its rate of change between constructive and destructive interference precipitated by the variation in the measuring beam frequency. The proposed incremental variations of measuring beam frequency provide for sampling the intensities of corresponding points within a succession of interference patterns spanning at least one cycle of constructive and destructive interference for each point.

The invention can also be practiced as a frequency-scanning method of measuring topographical features of an test object. For example, the invention provides for mounting a test object in a fixed position adjacent to a reference element of an interferometer. A measuring beam is propagated through the interferometer toward the reference element and the test object. A reference beam portion of the measuring beam acquires information from a surface of the reference element, and an object beam portion of the measuring beam acquires information from a surface of the test object. Combined intensity variations of the information-laden object and reference beams are detected as a comparison between the surfaces of the test object and the reference element. An effective frequency content of the object and reference beams is varied as received by the detector. The detected intensity variations induced by variations in the effective frequency content of the information-laden object and reference beams are converted into measures of path length differences between the object and reference beams for measuring topographical features of the test object surface with respect to the reference element surface.

Preferably, the reference beam is reflected from the reference element surface and the object beam is reflected from the test object surface. The reflected reference beam and the reflected object beam propagate along a common path to the detector. The effective frequency of the beams is preferably varied by increments that produce detected intensity variations that can be fit by sinusoidal curves having transform frequencies that vary as a function of path length differences between the reference beam and the object beam. A resolution of the locations of the surface features is dependent upon a nominal frequency of the object and reference beams, but a resolution of the measures of the topographical features is independent of the nominal frequency of the object and reference beams. The detected intensity variations are preferably associated with different locations of the test object surface. The detected intensity variations associated with the different locations of the test object surface provide measures of surface features at the different locations independently of the intensity variations of adjacent locations of the test object surface.

A similar frequency-scanning method can be used in accordance with the invention for operating a Fizeau interferometer to measure profile variations of a test object. A measuring beam illuminates a reference element. A first portion of the measuring beam reflects from a surface of a reference element as a reference beam. A second portion of the measuring beam transmits through the reference element to and from a surface of the test object as an object beam. Both the reference beam and the test beam propagate along a common path to a detector. The surfaces of the reference element and the test object are imaged onto the detector using the reference and object beams for relating transverse coordinates of the test object surface to transverse coordinates of the detector. A plurality of intensity variations registered by the detector are produced by constructive and destructive interference between localized portions of the object and reference beams associated with different transverse coordinates on the test object surface.

An effective frequency of the measuring beam is varied, alternating the intensity variations between conditions of constructive and destructive interference at modulation frequencies sensitive to path length differences between corresponding points on the surfaces of the test object and reference element. The modulation frequencies of the alternating intensity variations are identified for referencing the path length variations between the test object surface and the reference element surface as relative measures of profile variations of the test object surface at the different transverse coordinates of the test object surface.

Preferably, a succession of interference patterns are detected corresponding to different effective frequencies of the measuring beam. Each of these interference patterns can be apparent as a speckle pattern representing profile variations with step sizes that exceed fringe intervals of interference patterns. The intensity variations associated with the different transverse coordinates of the test object surface can be separately evaluated to provide measures of surface profile variations at the different transverse coordinates independently of the intensity variations at adjacent transverse coordinates of the test object surface.

The effective frequency of the measuring beam is preferably modified by increments that are fine enough to unambiguously distinguish profile variations between the different transverse coordinates of the test object surface having a range of magnitudes of at least ten times a nominal wavelength of the measuring beam. Measurement ranges corresponding to multiples of 100, 1000, or more times the nominal wavelength are possible by choosing sufficiently fine increments of frequency modification.

The frequency of the measuring beam is also preferably modified throughout a range or band of frequencies sufficient in breadth to distinguish profile variations between the different transverse coordinates of the test object surface having magnitudes that differ by less than ten times the nominal wavelength of the measuring beam. Larger frequency ranges of the measuring beam can be used to distinguish profile variations between the different transverse coordinates of the test object surface having magnitudes that differ by less than the nominal wavelength of the measuring beam.

The use of frequency-scanning methodologies in accordance with the present invention obviates the need for phase-shifting actuators and techniques to evaluate interference patterns or to resolve measurement ambiguities. This allows the use of a reference element that integrates a reference surface and a beamsplitter for providing a common path for an object beam and a reference beam within an interferometer. Multiple interference measurements can be made over a range of different illumination frequencies with reduced sensitivity to environmental effects or to dispersions between object and reference paths that could otherwise introduce errors into the measurements.

DETAILED DESCRIPTION

Figure 3:
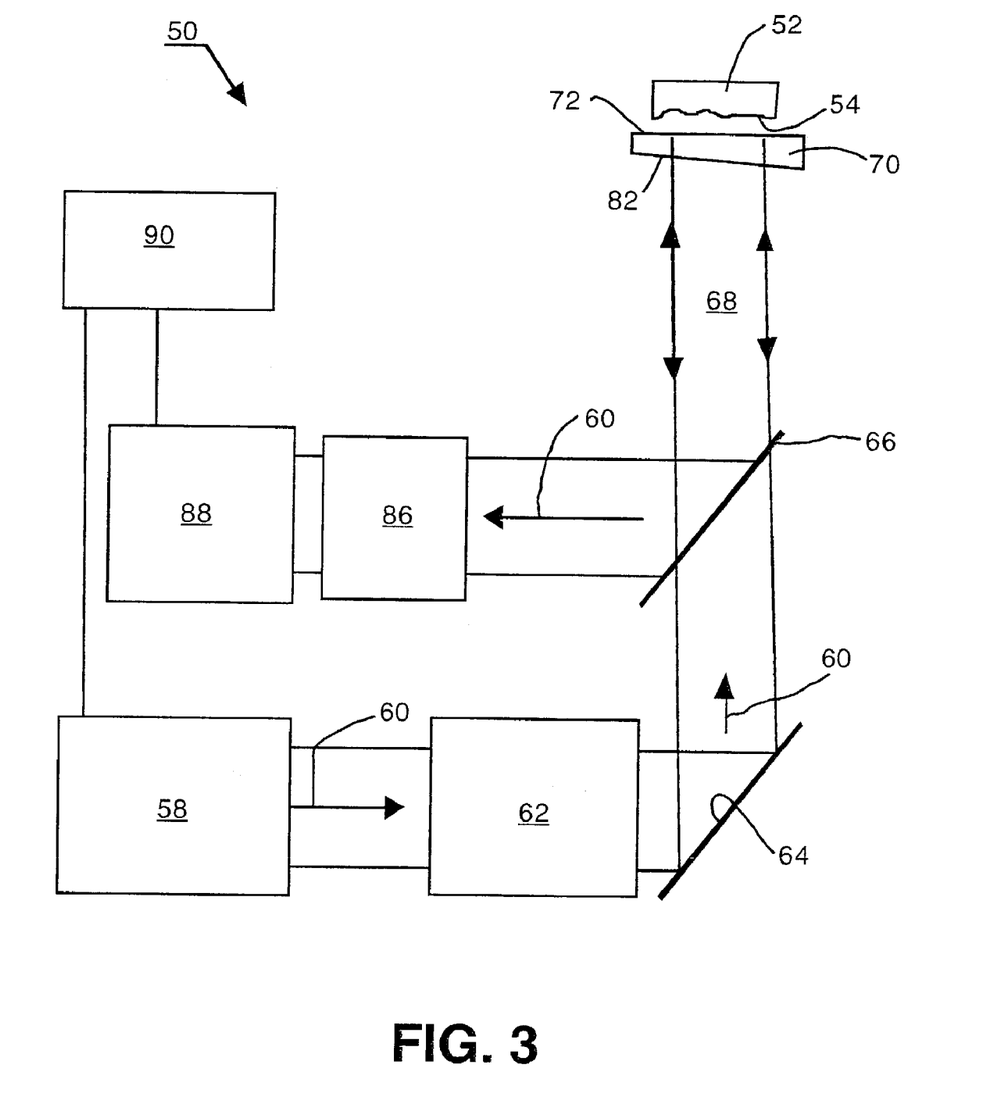
FIG. 3 is a block diagram of an improved frequency-scanning interferometer in accordance with the invention having a reference element incorporating the functions of a beamsplitter and reference surface.

As shown in FIG. 3, an exemplary frequency-scanning interferometer 50 is arranged in accordance with the invention as a common-path (e.g., Fizeau) interferometer for measuring topographical features of a test object 52. A radiation source 58 produces a measuring beam 60 for acquiring information about a test surface 54 on the test object 52. Preferably, the radiation source 58 is a source of coherent radiation, such as a diode laser (e.g., a GaAs-based laser), tunable through a limited range of frequencies (or wavelengths). A choice of nominal wavelength (e.g., 780 nm) can be made within the visible or invisible spectrum and can be selected on such bases as cost, resolution, and reflectance of the test object An exemplary frequency-tunable laser preferred for the practice of this invention is disclosed in copending U.S. application Ser. No. 10/446, 012, filed 27 May 2003, entitled TUNABLE LASER SYSTEM HAVING AN ADJUSTABLE EXTERNAL CAVITY, now U.S. Pat. No. 6,690,690, which is hereby incorporated by reference.

A beam conditioner 62 functioning as both a beam expander and a collimator expands and collimates the measuring beam 60. A directional optic 64 in the form of a folding mirror together with a beamsplitter 66 form a directional system for routing the measuring beam 60 along a measurement path 68 to the test object 52. The directional system can take a variety of forms for accomplishing this purpose, including eliminating the directional optic 64 by reorienting the radiation source 58. Preferably, the beamsplitter 66 is arranged or otherwise treated so that the measuring beam 60 transmits through the beamsplitter 66 in one direction but reflects from the beamsplitter 66 in the opposite direction. Well-known polarization techniques can be used for this purpose.

A reference element 70 (shown also in FIG. 4) is positioned along the measurement path 68 adjacent to the test object 52 in a fixed position with respect to the test object 52. A surface 72 of the reference element 70 functions as both a reference surface and as a beamsplitter for distinguishing a reference beam portion 76 of the measuring beam 60 that acquires information concerning the reference surface 72 of the reference element 70 from an object beam portion 78 of the measuring beam 60 that acquires information concerning the test surface 54 of the test object 52.

Figure 4:
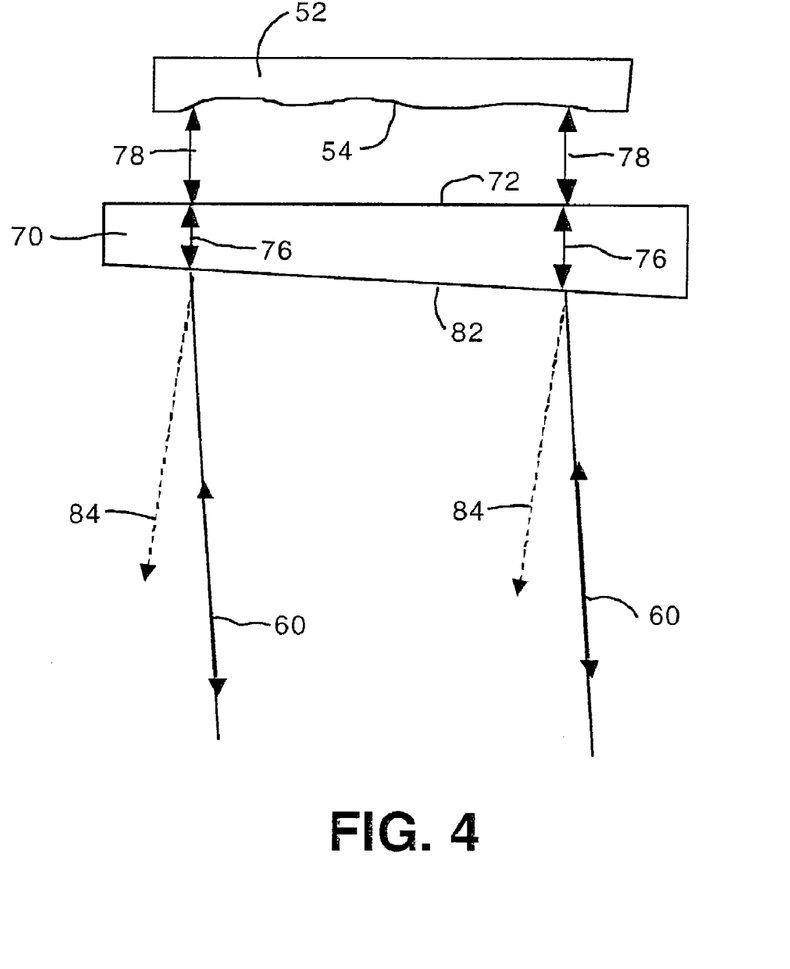
FIG. 4 is an enlarged diagrammatic view of an exemplary reference element having a wedge shape for isolating the reference surface.

The reference element 70 has the form of a wedge-shaped reference flat with a planar entrance surface 82 inclined with respect to the reference surface 72, which is also planar. The shape of the reference surface 72 preferably matches the nominal shape of the test surface 54 for taking measures as departures from null interference patterns. Such reference flats are commercially available from Opto-Sigma of Santa Ana, Calif. One example flat is part number 0380-0780-W, which has a wedge angle of one degree.

The collimated measuring beam 60 is intended for substantially passing through the entrance surface 82, and an antireflection coating can be applied to the entrance surface 82 for this purpose. However, any portion 84 of the measuring beam 60 that does reflect from the inclined reference surface 82 is reflected at a non-normal angle of reflection so that the reflected portion 84 can be discarded from the interferometer 50. Subsequent aperture stops (not shown) associated with an imaging system 86 (described infra) can be used for blocking the unwanted reflections of the entrance surface 82.

The larger remaining portion of the measuring beam 60 strikes the reference surface 72 at normal incidence. The reference beam portion 76 of the measuring beam 60 reflects from the reference surface 72, and the object beam portion 78 of the measuring beam 60 transmits through the reference surface 72. The transmitted object beam portion 78 reflects from the test surface 54 and co-linearly rejoins the reflected reference beam portion 76 at the reference surface 72 as the recombined measuring beam 60 propagating on a return path to the beamsplitter 66. The recombined measuring beam 60 contains interferometric representations of path length differences between the reference surface 72 and the test surface 54.

The relative strength of the reflected reference beam portion 76 can be adjusted by applying an optical coating to the reference surface 72. Preferably, the strengths of the returning reference and object beam portions 76 and 78 are similar to maximize interference contrast between the beam portions. Thus, for highly reflective (specular) test objects, a coating supporting reflectivity near 50% can be used; whereas for diffusely reflective test objects, a lower reflectivity coating can be used to match the reflectivity of the reference surface 72 to the lower reflectivity of the test surface 54. The coatings applied to the reference surface 72 are also selected to minimize unwanted secondary reflections of the returning test beam portion 78 from the reference surface 72.

The beamsplitter 66 of the directional system also provides for routing the recombined measuring beam 60 containing the information-laden reference and object beam portions 76 and 78 along the measuring path 68 to a detector 88. The measuring path 68 provides a common path for both the reference beam and object beam portions 76 and 78 of the recombined measuring beam 60, as well as for their precursors in the original measuring beam 60, throughout the entire length of the measuring path 68 from the radiation source 58 through the detector 88 with the exception of the interface (i.e., cavity) between the reference surface 72 and the object surface 54. This minimizes any differential systematic or environmental effects on the reference beam and object beam portions 76 and 78 of the recombined measuring beam 60.

The imaging system 86 preferably includes focusing optics for imaging both the test surface 54 and the reference surface 72 onto the detector 88 using the recombined measuring beam 60 containing the information-laden reference and object beam portions 76 and 78. The detector 88 detects combined intensity variations of the information-laden reference and object beam portions 76 and 78 as a comparison between the surfaces 54 and 72 of the test object 52 and the reference element 70. Preferably, the detector 88 includes a detector array of individual detectors for separately measuring intensity variations associated with different locations of the test surface 54. For example, the detector 88 can be a CCD (charge-coupled device) camera containing an addressable array of photoelectric detectors in a matrix of desired density (e.g., 10 micron diameter photoelectric detectors arranged in a 1000 by 1000 matrix).

A computer 90 is preferably part of a computer system including peripheral devices, such as a display, a printer, a mouse, and a keyboard as typical for interferometer devices. The computer 90 also includes a capabilities for controlling both the radiation source 58 and the detector 88. For example, the computer 90 provides for tuning the radiation source 58 through a prescribed succession of illumination frequencies. The computer 90 also provides for capturing intensity data from the detector 88 for capturing interference patterns associated with each of the succession of illumination frequencies.

Digital processing is also carried out within the computer 90 for determining rates (i.e., modulation or interference frequencies) at which the intensities of the individual detectors cycle through periods of constructive and destructive interference as a function of the change in illumination frequency. Discrete Fourier transforms can be used for this purpose. Preferred techniques for carrying out the digital processing, including identifying the modulation frequencies and equating the identified modulation frequencies with surface profile variations of the test surface 54, are disclosed in co-pending U.S. Provisional Application No. 60/391,004, filed Jun. 24, 2002, entitled SYSTEM FOR PROCESSING MULTI-WAVELENGTH INTERFEROMETRIC DATA, which is hereby incorporated by reference.

The detector 88 detects a plurality of intensity variations produced by constructive and destructive interference between localized portions of the reference and object beam portions 76 and 78 associated with different transverse coordinates on the test surface 54. The computer 90 incrementally modifies an effective frequency of the measuring beam 60, alternating the intensity variations between conditions of constructive and destructive interference at modulation frequencies sensitive to path length differences between corresponding points on the surfaces 54 and 72 of the test object 52 and reference element 70. Further processing by the computer 90 identifies the modulation frequencies from the alternating intensity variations for referencing the path length variations between the test surface 54 and the reference surface 72 as relative measures of profile variations (i.e., topographical features) of the test surface 54 at the different transverse coordinates of the test surface 54.

The imaging system 88 preferably images a succession of interference patterns between the reference and object beam portions 76 and 78 corresponding to different effective frequencies of the measuring beam 60. Each of these interference patterns can be apparent as a speckle pattern representing profile variations with step sizes that exceed fringe intervals of interference patterns. Preferably, the effective frequency of the measuring beam 60 is varied by increments that are fine enough to unambiguously distinguish profile variations between the different transverse coordinates of the test surface 54 having a range of magnitudes of at least ten times a nominal wavelength of the measuring beam 60. Even finer increments of the measuring beam frequency can be used to extend the measuring range to 100 or 1000 times the nominal wavelength of the measuring beam 60. Neither phase shifting at individual transverse coordinates nor phase unwrapping between individual transverse coordinates is needed to achieve the desired range of measurement.

The intensity variations associated with the different transverse coordinates of the test surface 54 provide measures of surface profile variations at the different transverse coordinates independently of the intensity variations at adjacent transverse coordinates of the test surface 54. In addition, while a resolution of the locations of the surface profile variations is dependent upon either the density of the detector array or a nominal frequency of the measuring beam 60 as a result of diffraction-limited imaging, a resolution of the measures of the surface profile variations themselves is independent of both the density of the detector array and the nominal frequency of the measuring beam 60. Instead, accuracy is determined by such factors as the number and range (band) of frequencies detected and the accuracy with which the frequencies are known. For example, the range of frequencies is preferably of sufficient breadth to distinguish profile variations between the different transverse coordinates of the test object surface 54 having magnitudes that differ by less than ten times the nominal wavelength of the measuring beam 60 or that differ by even less than the nominal wavelength itself. Thus, phase shifting is also not needed to extend the accuracy of the measurement, since measurement accuracy is not tied to the nominal frequency of the measuring beam 60.

The modulation frequency of the intensity variations that vary through conditions of constructive and destructive interference as a function of the change in measuring beam frequency 60 is derived from the intensity data as a cosine function that has two symmetric solutions, shown as peaks in FIG. 2. As path lengths change between the reference and object beam portions 76 and 78 in accordance with the magnitude of the profile variations of the test surface 54, one of the peaks devolves into the other, which limits the overall range of unambiguous measurement. Although phase shifting can be used to distinguish between the peaks 40 and 42 to double the range of unambiguous measurement for a given frequency interval of measurement, the unambiguous range can also be doubled or more for either peak 40 or 42 considered individually by using finer frequency intervals of the measuring beam 60. Since phase shifting is particularly troublesome for common-path interferometers, the variation in frequency interval unique to frequency-shifting interferometry is preferably used to achieve the desired range of measurement.

Figure 5:
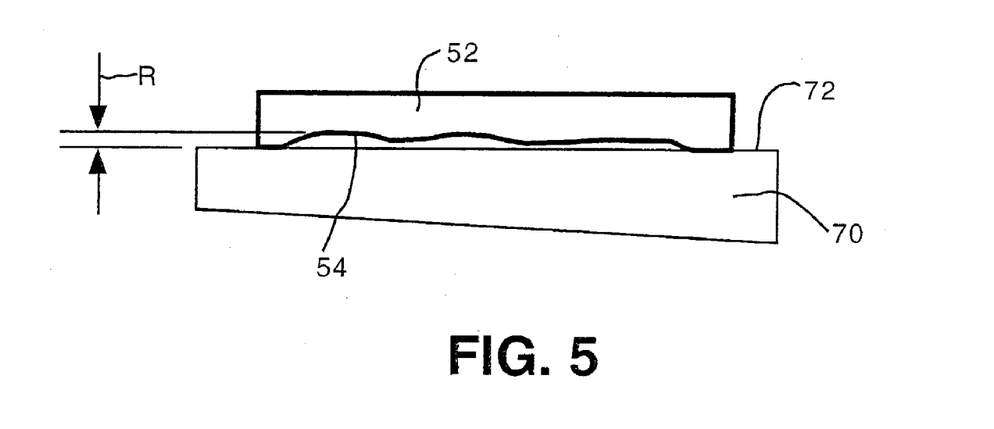
FIG. 5 is a view similar to FIG. 4 showing the reference element supporting the test object so that the test object rests on the reference surface.

Preferably, the reference surface 72 of the reference element 70 also functions as a mounting surface for the test object 52 as shown in FIG. 5. The test surface 54 rests directly on the reference surface 72. The portions of the test surface 54 in contact with the reference surface 72 produce a zero optical path length difference between the reference and object beam portions 76 and 78. That is, the value of R in Equation (5) is zero if the test object 52 sits directly on the reference element 70 as shown in FIG. 5. Regions of the test object surface 54 that are spaced apart from the reference surface 72 have a larger value of R. Thus, the measured value of R corresponds to the physical distance of topographical features of the test surface 54 from the reference surface 72.

Figure 6:
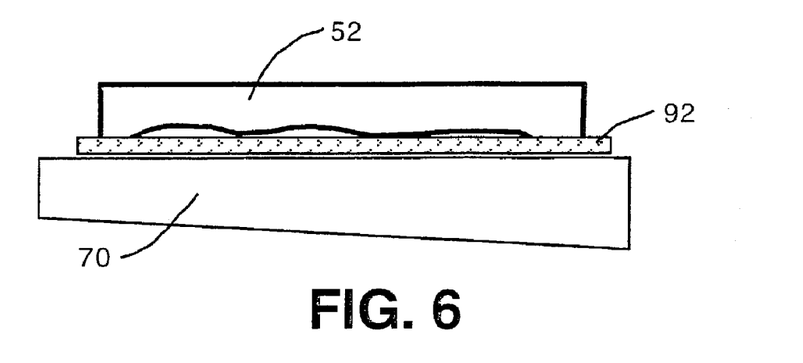
FIG. 6 is a similar view showing the test object resting on an intermediate, mainly transparent support member supported by the reference surface.
Figure 7:
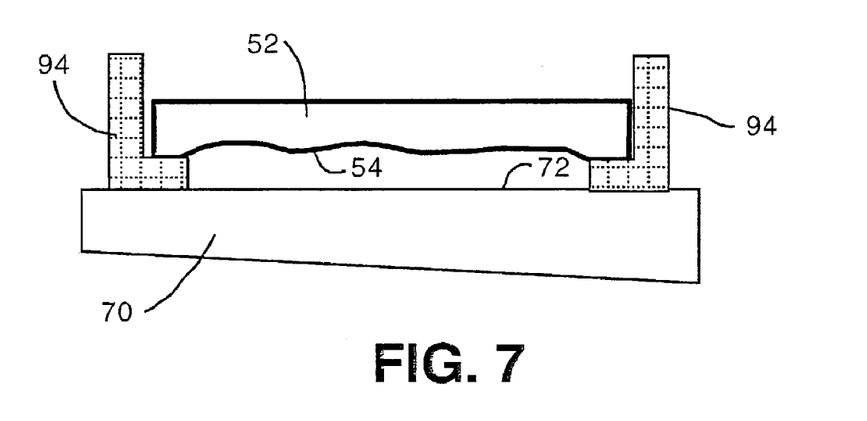
FIG. 7 is a similar view showing the test object resting on a supporting fixture that uses the reference surface of the reference element as a datum.

FIGS. 6 and 7 show alternative embodiments in which intermediate, mainly transparent support structures 92 and 94 support the test object 52 in a fixed position with respect to the reference surface 72. The intermediate support structure 92 is shown as a support pad, and the intermediate support structure 94 is shown as a fixture; but a variety of other intermediate support structures, including a wire grid or sectioned support pads or fixturing, could be used as well. The reference surface 72 can function as a datum surface for the support structures 92 or 94 that hold the test object 52 in a fixed position along the measuring path 68 from the reference surface 72.

With the test object 52 resting directly or indirectly on the reference element 70, differential environmental influences are further reduced. In addition, requirements of tilt adjustment or longitudinal position adjustment of the test object 52, which are important in the conventional configuration shown in FIG. 1, are essentially eliminated. This results in a reduced complexity for supporting the test object 52.

Figure 8:
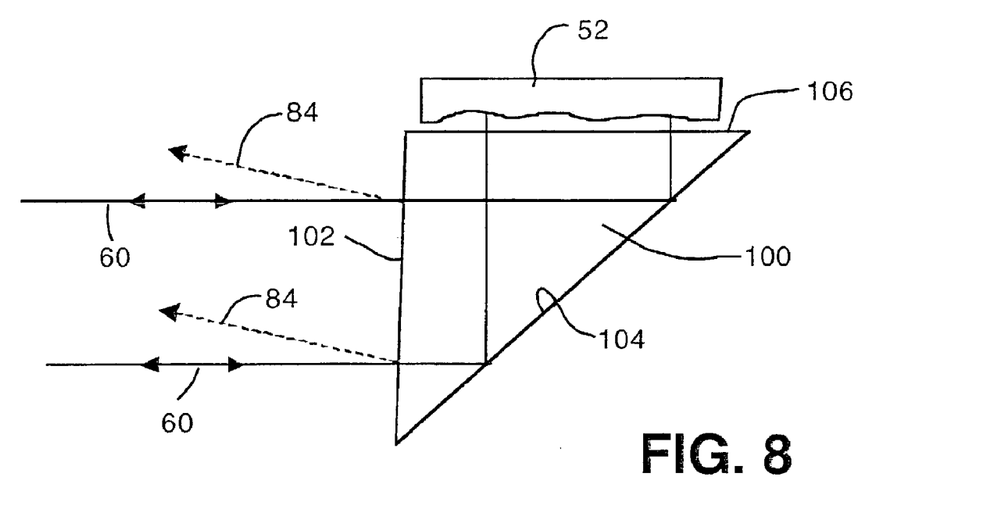
FIG. 8 is a view similar to FIG. 4 showing an alternative reference element having the shape of a prism.

An alternative reference element 100 is shown in FIG. 8 as a prism. Like the reference element 70, an entrance surface 102 can be inclined from normal to the collimated measuring beam 60 so that any reflections 84 are easily discarded (i.e., blocked by apertures within the imaging system 86). An anti-reflection coating could also be used for this purpose. A surface 104 of the reference element 100 folds the measuring beam 60, and a surface 106 functions as both a beamsplitter and a reference surface, similar to the reference surface 72 of the reference element 70. Also like the reference surface 72, the reference surface 106 preferably provides for directly or indirectly supporting the test object 52 in a fixed position with respect to the reference surface 106. In addition, both of the exemplary reference elements 70 and 100 can function as windows of the interferometer 50 that transmit light (radiation) to the test object surface 54 and admit light (radiation) reflected from the test object surface 54, while isolating and protecting an interior environment of the interferometer from contamination or other environmental effects.

A common-path interferometric system is advantageous for frequency-scanning interferometry because 1) the effects of dispersion and turbulence are reduced by having an essentially common optical path, 2) a measured value of zero optical path difference corresponds to the test object 52 resting directly on the reference surface 72 or 106, and 3) the complexity of the mounting for supporting the test object 52 is reduced. These advantages can be maintained (i.e., without relatively moving the test object and reference element) while achieving desired goals for measurement accuracy and measurement range because phase shifting is not required for achieving either.

From the foregoing description, it will be apparent that there has been provided an improved frequency-scanning interferometer that is simpler and more compact in design than such interferometers as have been provided in the prior art and which produces accurate surface profile measurements without the need for phase-shifting methods or their attendant computational methods based on assumptions for smooth surfaces. Variations and modifications of the described system and components thereof will undoubtedly become apparent to those skilled in the art. Accordingly, the foregoing description should be taken as illustrative and not in a limiting sense.

I claim:

1. A frequency-scanning interferometric measuring system for measuring topographical features of a test object comprising:

a directional system for routing a measuring beam along a measurement path toward the test object;

a reference element positioned along the measurement path adjacent to the test object in a fixed position with respect to the test object for distinguishing a reference beam portion of the measuring beam that acquires information concerning a surface of the reference element from an object beam portion of the measuring beam that acquires information concerning a diffuse surface of the test object;

the directional system also providing for routing the information-laden object and reference beams along a common path toward a detector; the detector providing for detecting combined intensity variations of the information-laden object and reference beams as a comparison between the surfaces of the test object and the reference element;

an imager that images interference patterns between the information-laden object and reference beams, wherein the information patterns are apparent as speckle patterns based at least in part on variations of the diffuse test object surface that exceed fringe intervals of the interference patterns;

a frequency modifier that varies an effective frequency content of the object and reference beams detected by the detector;

a processor that converts detected intensity variations induced by variations in the effective frequency content of the information-laden object and reference beams into measures of path length differences between the object and reference beams for measuring topographical features of the test object surface with respect to the reference element surface; and the processor being arranged for extracting from the effective frequency content of the information-laden object and reference beams relative modulation frequency measurements that distinguish profile variations between different transverse coordinates of the test object surface.

2. The system of claim 1 further comprising a radiation source, and the frequency modifier provides for tuning the radiation source for varying the frequency content of the measuring beam.

3. The system of claim 1 in which both the measurement path toward the test object and the common path toward the detector overlap in opposite directions between the directional system and the reference element surface.

4. The system of claim 1 in which the reference element surface participates in mounting the test object at a fixed spacing between the test object and reference element surfaces.

5. The system of claim 1 in which the detector includes a detector array of individual detectors for separately measuring intensity variations associated with different locations of the test object surface, and the intensity variations of the individual detectors provide measures of surface profile features at the different locations independently of the intensity variations of adjacent individual detectors.

6. The system of claim 5 further comprising an imaging system for imaging both the test object surface and the reference element surface onto the detector array using the information-laden object and reference beams.

7. A frequency-scanning method of measuring topographical features of a test object comprising the steps of:

mounting a test object in a fixed position adjacent to a reference element of an interferometer;

propagating a measuring beam through the interferometer toward the reference element and the test object;

distinguishing a reference beam portion of the measuring beam that acquires information from a surface of the reference element from an object beam portion of the measuring beam that acquires information from a diffuse surface of the test object;

detecting combined intensity variations of the information-laden object and reference beams as a comparison between the surfaces of the test object and the reference element in the form of an interference pattern apparent as a speckle pattern based at least in part on variations of the diffuse test object surface that exceed fringe intervals of the interference pattern;

varying an effective frequency content of the object and reference beams received at the detector; and convening detected intensity variations induced by variations in the effective frequency content of the information-laden object and reference beams into measures of path length differences between the object and reference beams for measuring topographical features of the test object surface with respect to the reference element surface, wherein the step of converting includes extracting from the effective frequency content of the information-laden object and reference beams relative modulation frequency measurements that distinguish profile variations between different transverse coordinates of the test object surface.

8. The method of claim 7 in which the step of distinguishing includes reflecting the reference beam from the reference element surface and reflecting the object beam from the test object surface.

9. The method of claim 8 comprising a further step of propagating the reflected reference beam and the reflected object beam along a common path to the detector.

10. The method of claim 7 in which the step of varying an effective frequency includes varying the effective frequency by increments that produce detected intensity variations that can be fit by sinusoidal curves having transform frequencies that vary as a function of path length differences between the reference beam and the object beam.

11. The method of claim 10 in which a resolution of the locations of the surface features is dependent upon a nominal frequency of the object and reference beams, and a resolution of the measures of the topographical features is independent of the nominal frequency of the object and reference beams.

12. The method of claim 7 in which the step of detecting includes separately measuring detected intensity variations associated with different locations of the test object surface.

13. The method of claim 12 in which the step of converting includes converting the detected intensity variations associated with the different locations of the test object surface to provide measures of surface features at the different locations independently of the intensity variations of adjacent locations of the test object surface.

14. A Fizeau interferometer for measuring profile variations of a test object using frequency scanning comprising:

a radiation source for producing a measuring beam;

a reference element having a reference surface that reflects a first portion of the measuring beam as a reference beam and that transmits a second portion of the measuring beam as an object beam to and from a diffuse surface of the test object;

a detection system that detects a plurality of intensity variations produced by constructive and destructive interference between localized portions of the object and reference beams traceable to different transverse coordinates on the diffuse test object surface in the form of an interference pattern apparent as a speckle pattern based at least in part on variations of the diffuse test object surface that exceed fringe intervals of the interference pattern;

a pathway that conveys the measuring beam to the reference element surface and including a common pathway that conveys both the object beam as returned from the test object surface and the reference beam as returned from the reference element surface to the detection system;

a frequency modifier that modifies an effective frequency of the measuring beam producing an alternation of the intensity variations between conditions of constructive and destructive interference at modulation frequencies corresponding to path length variations between the test object surface and the reference element surface at the different transverse coordinates of the test object surface; and a processor that identifies the modulation frequencies from the alternating intensity variations for referencing the path length variations between the test object surface and the reference element surface as relative measures of profile variations of the test object surface at the different transverse coordinates of the test object surface.

15. The interferometer of claim 14 in which the frequency modifier includes a frequency tuner for the radiation source for varying: a frequency of the measuring beam.

16. The interferometer of claim 14 in which the frequency modifier modifies the effective frequency of the measuring beam by increments that are fine enough to unambiguously distinguish profile variations between the different transverse coordinates of the test object surface having a range of magnitudes of at least ten times a nominal wavelength of the measuring beam.

17. The interferometer of claim 16 in which the frequency modifier modifies the frequency of the measuring beam by increments that are fine enough to unambiguously distinguish profile variations between the different transverse coordinates of the test object surface having a range of magnitudes of at least 100 times the nominal wavelength of the measuring beam.

18. The interferometer of claim 17 in which the frequency modeler modifies the frequency of the measuring beam by increments that are fine enough to unambiguously distinguish profile variations between the different transverse coordinates of the test object surface having a range of magnitudes of at least 1000 times the nominal wavelength of the measuring beam.

19. The interferometer of claim 16 in which the frequency modifier modifies the frequency of the measuring beam throughout a band of frequencies sufficient in breadth to distinguish profile variations between the different transverse coordinates of the test object surface having magnitudes that differ by less than ten times a nominal wavelength of the measuring beam.

20. The interferometer of claim 19 in which the frequency modifier modifies the frequency of the measuring beam throughout a band of frequencies sufficient in breadth to distinguish profile variations between the different transverse coordinates of the test object surface having magnitudes that differ by less than the nominal wavelength of the measuring beam.

21. The interferometer of claim 14 in which the reference element is a window of the interferometer that transmit radiation to the test object surface and that admits radiation reflected from the test object surface.

22. The interferometer of claim 21 in which the reference element surface participates in mounting the test object at a fixed spacing between the test object surface and the reference element surface.

23. The interferometer of claim 14 in which the detection system includes a detector array of individual detectors for separately measuring intensity variations associated with the different transverse coordinates of the test object surface, and the intensity variations of the individual detectors provide measures of surface profile features at the different transverse coordinates independently of the intensity variations of adjacent individual detectors.

24. The interferometer of claim 23 further comprising an imaging system for imaging both the test object surface and the reference element surface onto the detector array using the object and reference beams.

25. A frequency-scanning method of operating a Fizeau interferometer for measuring profile variations of a test object comprising the steps of:
    illuminating a reference element with a measuring beam;
    reflecting a first portion of the measuring beam from a surface of a reference element as a reference beam;
    transmitting a second portion of the measuring beam through the reference element to and from a diffuse reflective surface of the test object as an object beam;
    conveying the reference beam and the object beam along a common path to a detector;
    imaging the surfaces of the reference element and the test object onto the detector using the reference and object beams in the form of an interference pattern apparent as a speckle pattern based at least in part on variations of the diffuse test surface that exceed fringe intervals of the interference pattern for relating transverse coordinates of the test object surface to transverse coordinates of the detector;
    detecting a plurality of intensity variations within the interference patterns produced by constructive and destructive interference between localized portions of the object and reference beams associated with different transverse coordinates on the test object surface;
    modifying an effective frequency of the measuring beam alternating the intensity variations between conditions of constructive and destructive interference at modulation frequencies sensitive to path length differences between corresponding points on the surfaces of the test object and reference element; and
    identifying the modulation frequencies from the alternating intensity variations for referencing the path length variations between the test object surface and the reference element surface as relative measures of profile variations of the test object surface at the different transverse coordinates of the test object surface.

26. The method of claim 25 in which the step of imaging includes imaging a succession of the interference patterns between the object and reference beams corresponding to different effective frequencies of the measuring beam, wherein each of the interference patterns is apparent as a speckle pattern representing profile variations with step sizes that exceed fringe intervals of interference patterns.

27. The method of claim 26 in which the step of identifying the modulation frequencies includes separately evaluating the intensity variations associated with the different transverse coordinates of the test object surface to provide measures of surface profile variations at the different transverse coordinates independently of the intensity variations at adjacent transverse coordinates of the test object surface.

28. The method of claim 25 in which the step of modifying the effective frequency includes modifying the effective frequency of the measuring beam by increments that are fine enough to unambiguously distinguish profile variations between the different transverse coordinates of the test object surface having a range of magnitudes of at least ten times a nominal wavelength of the measuring beam.

29. The method of claim 28 in which the step of modifying the effective frequency includes modifying the effective frequency of the measuring beam by increments that are fine enough to unambiguously distinguish profile variations between the different transverse coordinates of the test object surface having a range of magnitudes of at least 100 times the nominal wavelength of the measuring beam.

30. The method of clam 29 in which the step of modifying the effective frequency includes modifying the effective frequency of the measuring beam by increments that are fine enough to unambiguously distinguish profile variations between the different transverse coordinates of the test object surface having a range of magnitudes of at least 1000 times the nominal wavelength of the measuring beam.

31. The method of claim 28 in which the step of modifying the effective frequency includes modifying the frequency of the measuring beam throughout a band of frequencies sufficient in breadth to distinguish profile variations between the different transverse coordinates of the test object surface having magnitudes that differ by less than ten times the nominal wavelength of the measuring beam.

32. The method of claim 31 in which the step of modifying the effective frequency includes modifying the frequency of the measuring beam throughout a band of frequencies sufficient in breadth to distinguish profile variations between the different transverse coordinates of the test object surface having magnitudes that differ by less than the nominal wavelength of the measuring beam.

* * * * *